United States Patent Office 2,969,968
Patented Jan. 31, 1961

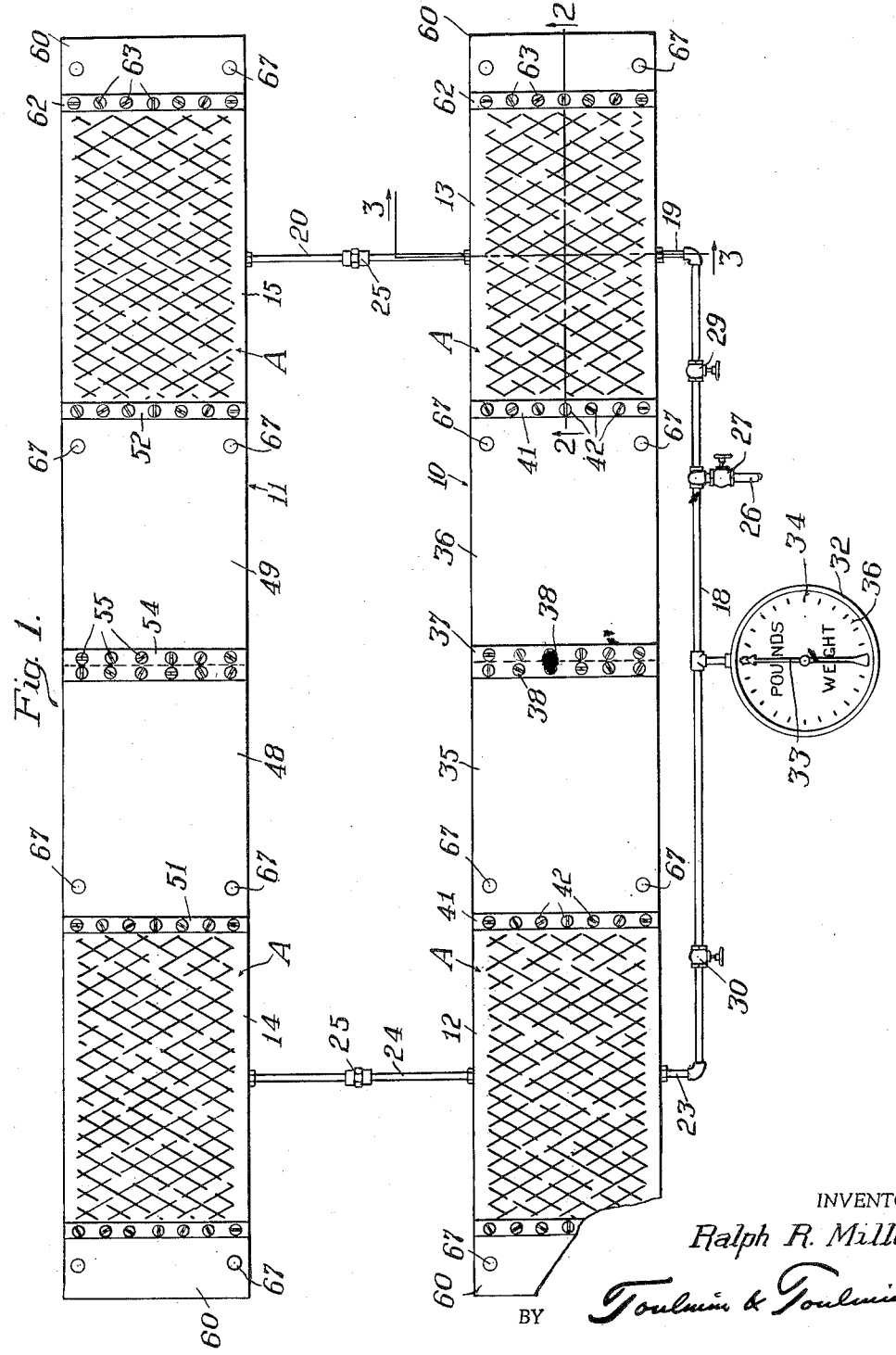

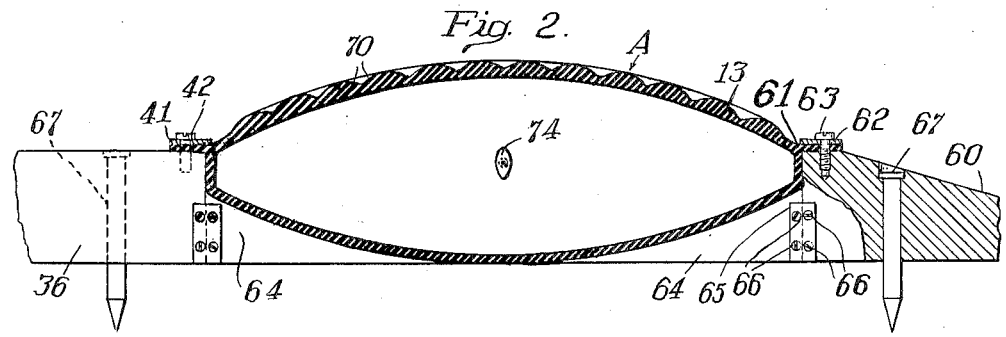
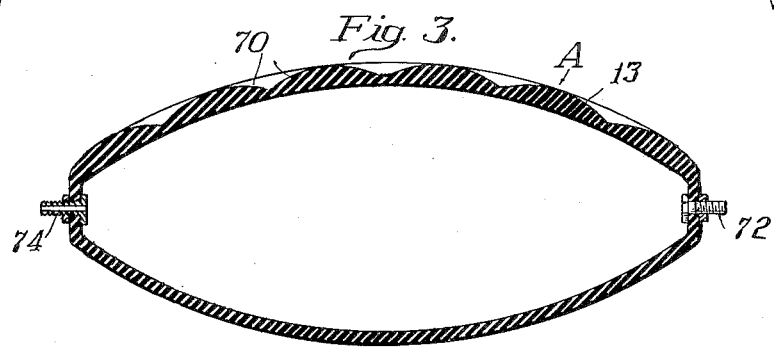
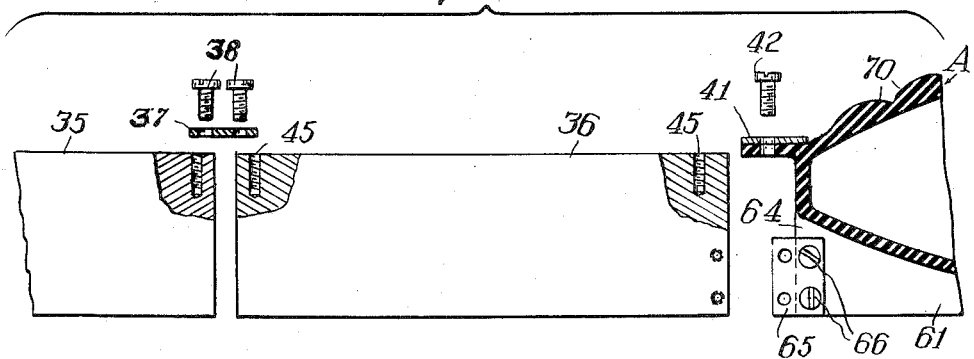

---

2,969,968

PNEUMATIC SCALES

Ralph R. Miller, Cowan, Tenn.

Filed Jan. 28, 1954, Ser. No. 406,853

3 Claims. (Cl. 265—47)

This invention relates to weighing scales and more particularly to a sturdy, portable pneumatic scale suitable for weighing trucks, tractors and similar equipment, as well as live stock, grain, feed and the like farm products.

Weighing scales of the platform type are well known and commonly used for determining the weight of trucks and heavy loads. These weighing machines, however, are expensive and are generally installed for operation in a pit constructed of concrete or masonry which, of course, adds to the cost and maintenance of the weighing machine. Moreover, once installed the weighing machine is permanently located and thus cannot be moved around from place to place as often found desirable. These disadvantages have greatly limited the sale and usefulness of such weighing devices.

More recently portable type scales have been proposed for use in determining the bearing loads on truck wheels and the like. Hydraulic pressure operated scales have been described as suitable. However, the initial and maintenance cost of such machines is relatively high. Furthermore, leakage of the hydraulic fluid from the system is encountered which requires replacement and frequent adjustment of the machine; otherwise, the weighing is inaccurate and when insufficient fluid is present such scales become inoperative.

It is, accordingly, a principal object of the present invention to overcome these disadvantages and provide a low-cost pneumatic weighing scale which is of simplified construction, yet rugged and sturdy and capable of being readily disassembled and moved from one location to another and set up for use.

Another object of this invention is to provide a weighing machine which is portable and adjustable for accommodating trucks and trailers of different length wheel bases so that the weight of the same may be readily determined.

Another object of the invention is to provide an improved weighing scale which is adapted for weighing the load on front and rear axles of trucks independently or in combination and wherein the weight of the load is shown on a dial gauge.

A further object of this invention is to provide a pneumatic weighing scale which is of simplified structure and operation and is suitable for selectively indicating the total load weight of the vehicle or the load on one or more wheels as desired.

Another object of the invention is to provide a pneumatic scale of the character described which may be set up for use at a temporary location, as for example, in a field or barn and used to weigh live stock, grain, feed or truck loads.

Still another object of the invention is to provide a pneumatic weighing scale of the portable type wherein use is made of pneumatic cushions as load responsive means, which are connected to a pressure responsive indicator or gauge which shows the weight in pounds directly on a dial of the indicator.

The improved weighing scales of this invention provide a portable pneumatically operable scale which can be manufactured and sold at a low cost and wherein the weight of the load may be read directly in pounds by noting the position of a pointer on a pound-dial scale without requiring further computation.

The mechanism for providing a portable pneumatic scale in accordance with this invention will be better understood from the following description taken in conjunction with the drawings forming a part of this specification, and in which:

Figure 1 is a plan view of a weighing scale constructed in accordance with this invention;

Figure 2 is a cross-sectional view taken through one of the pneumatic cushions, being taken substantially on the line 2—2 of Figure 1, and looking in the direction of the arrows, certain parts being broken away to illustrate the structure more clearly;

Figure 3 is a similar view in cross section as Figure 2, on an enlarged scale, taken substantially on the line 3—3 of Figure 1, and looking in the direction of the arrows; and Figure 4 is an exploded view, partly in section and broken away to illustrate the ease of disassembling the weighing scale and the substitution of different size extension blocks, as desired, to increase or decrease the length of the weighing scale runways.

Referring to the drawings, and more particularly to Figure 1, the pneumatic weighing scale illustrated comprises a pair of elongated parallel arranged platforms or runways 10 and 11, which may be constructed of wood or metal. The runways are spaced apart a suitable distance to receive the wheels of a truck or vehicle to be weighed. At the extremity of each runway a pneumatic cushion, generally designated A, is provided. The cushions which are constructed of rubber or the like plastic material are adapted to be inflated with air and positioned to support the tire or wheel of the vehicle being weighed.

The pneumatic cushions 12 and 13 of runway 10 are interconnected to the adjacent pneumatic cushions 14 and 15 respectively of runway 11 by a suitable piping or high pressure hose system, as illustrated in Figure 1. This system consists of the pipe length 18 which extends along the side of runway 10 and is connected through pipe section 19 to the pneumatic cushion 13, and this cushion in turn is connected to the pneumatic cushion 15 through pipe 20. Similarly, the pneumatic cushion 12 is connected to the pipe line 18 through pipe 23. Pneumatic cushions 12 and 14 are interconnected by means of pipe line 24. For convenience in disassembling the scales, unions 25 may be placed in the lines 20 and 24. Air pressure is admitted to the line 18 through line 26 which is connected to a source of air pressure, not shown.

A valve 27 in line 26 controls the fluid passing through this feed line to the system. Valves 29 and 30 in line 18 are utilized to confine the weighing to either the front or rear axle of the vehicle, or when both valves 29 and 30 are open, the entire vehicle can be weighed, as desired.

Communicating with the pipe line 18 is a gauge or pressure responsive indicator 32. This pressure responsive gauge or indicator may be of conventional construction and comprises a pointer 33 which moves over a dial 34 in response to load pressures applied to the pneumatic cushions A. Indicia 36 on the dial, over which the pointer 33 moves, designate weight in pounds or fractions thereof. Gauge 32 preferably is of the differential pressure gear type having gear ratios such as to enable it to register relatively small changes in load pressures applied to the pneumatic cushions.

The gauge 32, for example, may be calibrated by inflating the pneumatic cushions A of the system to 50 pounds per square inch. Pointer 33 on the dial is then set to zero reading. Then a known weight, e.g., 1000 pounds, is placed on each cushion. The dial reading of the pointer is then marked at 4000 pounds. Intermediate loads, if desired, may then be calculated or likewise determined by taking actual load readings. In this manner the gauge is calibrated to indicate the weight of the load applied on the pneumatic cushions directly in pounds. For example, axle loads may be read on gauge 32 by first cutting off air pressure to the opposite axle. When the load on the rear axle, for instance, is desired, valve 30 is closed and the pointer 33 set at zero before application of the load. In the case of a loaded truck, the same would be backed up onto the supporting cushions 13 and 15 after first closing valve 30 to cushions 12 and 14. An expanding diaphragm-type gauge also may be used and the same similarly calibrated to indicate the weight of the vehicle or truck in pounds, the gauge pointer being adjusted to zero when the pneumatic cushions are expanded to the desired extent preparatory to weighing.

The runway interconnecting the pneumatic cushions 12 and 13 comprises blocks 35 and 36, which blocks are suitably secured together by a metal plate or strips 37, the same being secured to the abutting blocks by means of machine screws or bolts 38. The opposite ends of the blocks 35 and 36 are similarly secured to the pneumatic cushions 12 and 13 respectively by means of a similar metal plate 41 and attaching screws 42. The sections of the runway are thus held together while being readily disassembled as where additional blocks or runway sections are required to be added or taken out to accommodate the vehicle being weighed. Such blocks, such as shown in Figure 4, are pretapped as at 45 to receive the fastening screws 46 and plate 47.

Similarly, in the adjacent runway 11, blocks 48 and 49 are provided which are of like construction as blocks 35 and 36 respectively. These blocks are likewise secured together and attached at their opposite ends to pneumatic cushions 14 and 15 by the metal plates 51 and 52 respectively. The blocks are detachably secured together at their abutting ends by means of the metal plate 54 and attaching machine screws 55.

To provide suitable ramps for the pneumatic cushions the outer ends of each of the runways 10 and 11 comprise ramps 60 which are of similar construction, being made of wood or metal and shaped, as shown in Figure 2. The ramps 60 are secured at their inner end to a flange 61 on the outer end of the pneumatic cushions, being suitably secured thereto by a plate 62 and attaching screws 63. The base portion, which comprises a dish-shaped block, generally designated 64, for receiving and supporting the pneumatic cushion is provided with a fastening plate 65 and attaching screws 66 for fastening the ramp to the cushion block. To hold the runways firmly and prevent them from shifting, elongated spikes 67 are provided at opposite sides of each of the ramps 60 and at opposite ends of each of the blocks adjacent the cushions, as illustrated in Figures 1 and 2.

The construction of the pneumatic cushions A is illustrated in Figures 2 and 3. The cushions, as illustrated, are fabricated of rubberized cord like an automobile tire casing, being fabricated as a single air tube. The outer or uppermost surface comprises a tread of heavy rubber as a tire tread and preferably shaped and molded to provide irregular or diamond-shaped lugs or projections 70 therein which are wear resistant and provide good friction contact with the tires or wheels of a vehicle being weighed. Air pressure from line 18 is connected to the pneumatic cushions A through a nipple 72, and, as in the case of the pneumatic cushions 12 and 13, a like nipple 74 is mounted in the opposite wall for interconnecting the cushions 14 and 15 respectively.

In the use of the weighing scale of the invention, the vehicle to be weighed is driven up onto the runway over the ramps 60 and the tires or wheels supported on the pneumatic cushions. The pneumatic cushions are previously inflated to the desired amount, and such as to bring the scale indicator reading on the dial 32 to zero. The differential pressure created as a result of the vehicle resting on the cushions is then read off in pounds on the indicator gauge. The total load may thus be gauged on the scale 32 which total load may either be all four wheels or one or the other of the axles. Where the load on one axle, such as the front or rear axle, is to be read on the gauge, then valves 29 and 30 are manipulated as required to restrict the air pressure to the proper pneumatic cushions whereby the load on each of the axles may be read on the gauge.

In fabricating the pneumatic scale of this invention, the various parts other than the pneumatic cushions may be made of wood or metal, such as iron, steel, or light weight metal, e.g., aluminum or magnesium. Further, the machine screws may be replaced with stud bolts or regular bolts and nuts, as desired, or other suitable fastening means used which can be readily removed when the weighing scale is to be removed to another location.

Where the weighing scale of the invention is to be used for weighing live stock, sacks of feed or the like, a temporary platform or other suitable supporting means is laid across the runways and arranged to rest on the pneumatic cushions. The cushions are then inflated to 50 pounds pressure which brings the pointer on the dial to zero and then the load is placed on the platform or support and the weight load on the dial gauge which, as described, is calibrated to read in pounds.

The invention thus provides a low cost weighing scale which is portable and free from moving parts, which is desirable. The weighing scale is constructed so as to be easily dismantled and removable to different locations as described for weighing various loads. Further, the weighing scale of the invention is rugged and adapted to weigh extremely heavy loads without distortion or breaking of the parts of the apparatus and the weight of the load is read directly from the dial gauge by variations of the fluid pressure in the system. The use of the elastic cushions render the weighing scale sensitive and uniform in operation and provides a weighing scale which is simple in operation and easy to operate.

The invention has been described with particular relation to a machine for weighing trucks and the like vehicles but it will be understood that the invention may readily be adapted for use in weighing various types of loads and further, by the installation of valves in the system, the load weight as applied to one or more of the pneumatic cushions may be read from the pressure gauge indicator.

The invention is further adapted for modifications and substitutions of the elements as may be required for weighing different types of loads and it is to be understood that the specific construction herein described is by way of an example rather than in a limited sense, the scope of the invention being more particularly described in the claims.

What is claimed is:

1. A weighing apparatus, comprising a pair of runways which are spaced apart and arranged to receive the wheels of a vehicle and providing runway wheel supports therefor, a pair of individual inflatable tubular cushion means disposed in each of said runways and in position to pneumatically contact and support the load of the wheels of the vehicle, said inflatable cushion means being fabricated of rubberized fabric to support the load on the uppermost wall of the cushions, conduit means for connecting the corresponding inflatable tubular cushions of each runway together, conduit means for connecting said pair of inflatable cushions on one of said runways, valve means in said latter conduit for controlling the pneumatic connection between the inflatable cushions at opposite ends of the runway, and pressure gauge means communicating with said latter conduit for registering the pressure in said conduit, said pressure gauge being calibrated to indicate pressure applied to said cushions.

2. A weighing apparatus, comprising a pair of runways which are spaced apart and arranged to receive the wheels of a vehicle and providing runway wheel supports therefor, a pair of individual inflatable tubular cushion means disposed in each of said runways and in position to pneumatically contact and support the load of the wheels of the vehicle, said inflatable cushion means being fabricated of rubberized fabric to support the load on the uppermost wall of the cushions, conduit means for connecting the corresponding inflatable tubular cushions of each runway together, conduit means for connecting said pair of inflatable cushions on one of said runways, valve means in said latter conduit for controlling the pneumatic connection between the inflatable cushions at opposite ends of the runway, valve means in said last-mentioned conduit for admitting air under pressure to said inflatable tubular cushions, and pressure gauge means communicating with said latter conduit for registering the pressure in said conduit, said pressure gauge being calibrated to indicate pressure applied to said cushions.

3. A weighing apparatus, comprising a pair of runways which are spaced apart and arranged to receive the wheels of a vehicle and providing runway wheel supports therefor, a pair of individual inflatable tubular cushion means disposed in each of said runways and in position to pneumatically contact and support the load of the wheels of the vehicle, said inflatable cushion means being fabricated of rubberized fabric to support the load on the uppermost wall of the cushions, conduit means for connecting the corresponding inflatable tubular cushions of each runway together, conduit means for connecting said pair of inflatable cushions on one of said runways, valve means in said latter conduit for controlling the pneumatic connection between the inflatable cushions at opposite ends of the runway, said inflatable cushions comprising a single air tube which is inflated a predetermined amount, and pressure gauge means communicating with said latter conduit for registering the pressure in said conduit, said pressure gauge being calibrated to indicate pressure applied to said cushions.

References Cited in the file of this patent

UNITED STATES PATENTS

| Number | Name | Date |
|---|---|---|
| 566,698 | Raab | Aug. 25, 1896 |
| 1,458,920 | Troll | June 12, 1923 |
| 1,822,463 | Taber | Sept. 8, 1931 |
| 2,051,042 | Hendel et al. | Aug. 18, 1936 |
| 2,060,890 | Olafson | Nov. 17, 1936 |
| 2,269,969 | Branick | Jan. 13, 1942 |
| 2,534,766 | Girdwood-Blackett | Dec. 19, 1950 |
| 2,577,100 | Alvarez | Dec. 4, 1951 |
| 2,684,594 | Furcini | July 27, 1954 |
| 2,704,661 | Maugh | Mar. 22, 1955 |
| 2,830,804 | Fisher | Apr. 15, 1958 |

FOREIGN PATENTS

| 195,793 | Great Britain | Apr. 12, 1923 |